United States Patent [19]

Yip et al.

[11] Patent Number: 4,817,992
[45] Date of Patent: Apr. 4, 1989

[54] CONNECTOR WITH REDUCED STRESSES

[75] Inventors: David Yip, Vancouver; Peter R. Gibb, Port Coquitlam, both of Canada

[73] Assignee: Novacorp International Consulting Ltd., Canada

[21] Appl. No.: 916,792

[22] Filed: Oct. 8, 1986

[30] Foreign Application Priority Data

Oct. 11, 1985 [CA] Canada .................................... 492802

[51] Int. Cl.$^4$ .............................................. F16L 37/12
[52] U.S. Cl. ...................................... 285/18; 285/315; 285/920
[58] Field of Search ................... 285/18, 27, 319, 320, 285/315, 314; 166/332, 216, 217, 207, 208, 323

[56] References Cited

U.S. PATENT DOCUMENTS

| | | |
|---|---|---|
| 3,339,944 | 9/1967 | Poague . |
| 3,339,947 | 9/1967 | Maisey . |
| 3,698,756 | 10/1972 | Groves ............................ 166/216 X |
| 3,863,715 | 2/1975 | Yonker ................................. 166/217 |
| 3,912,009 | 10/1975 | Davis, Jr. . |
| 4,040,264 | 8/1977 | Neilon . |
| 4,188,156 | 2/1980 | Fisher et al. . |
| 4,214,842 | 7/1980 | Franks . |
| 4,230,185 | 10/1980 | Fredd .................... 166/332 |
| 4,411,317 | 10/1983 | Gieswein . |
| 4,496,172 | 1/1985 | Walker ................................. 285/18 |
| 4,662,785 | 5/1987 | Gibb et al. . |
| 4,693,497 | 9/1987 | Pettus et al. ........................... 285/12 |
| 4,730,853 | 3/1988 | Gjessing ................................. 285/18 |

FOREIGN PATENT DOCUMENTS 2037347A 7/1980 United Kingdom .
2097042A 10/1982 United Kingdom .

Primary Examiner—Randolph A. Reese
Assistant Examiner—Anthony Knight
Attorney, Agent, or Firm—Stevens, Davis, Miller & Mosher

[57] ABSTRACT

Apparatus and method for reducing the local high tensile stress concentrations of a latch of a connector whereby the latch is loaded during make-up such that it is placed in bending, to the extent that the induced bending produces a compressive stress in the area of high tensile stress concentration. When this stress is added to normal stresses, the resultant tensile stress is reduced to an acceptable level.

2 Claims, 4 Drawing Sheets

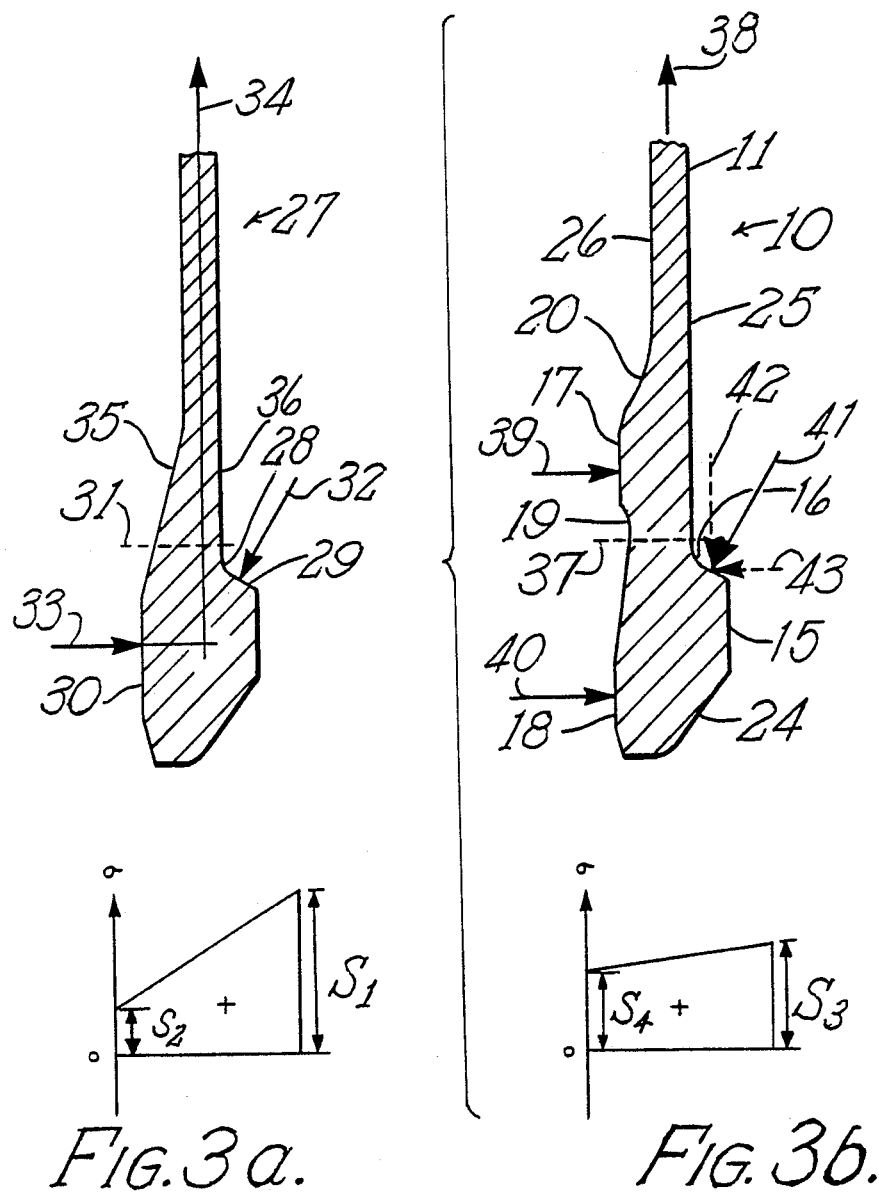

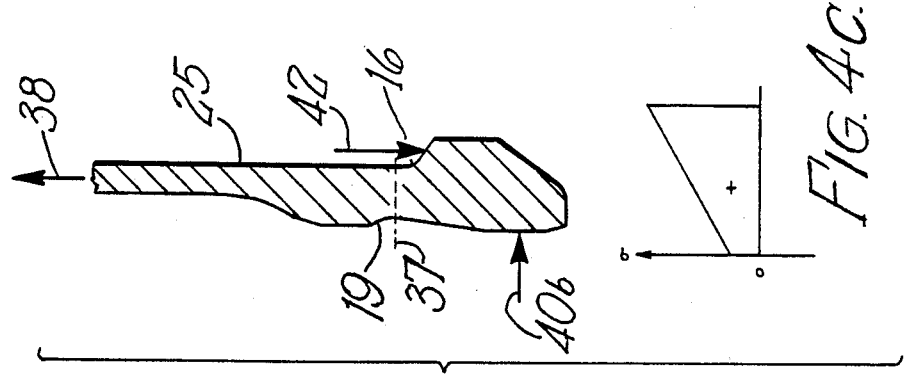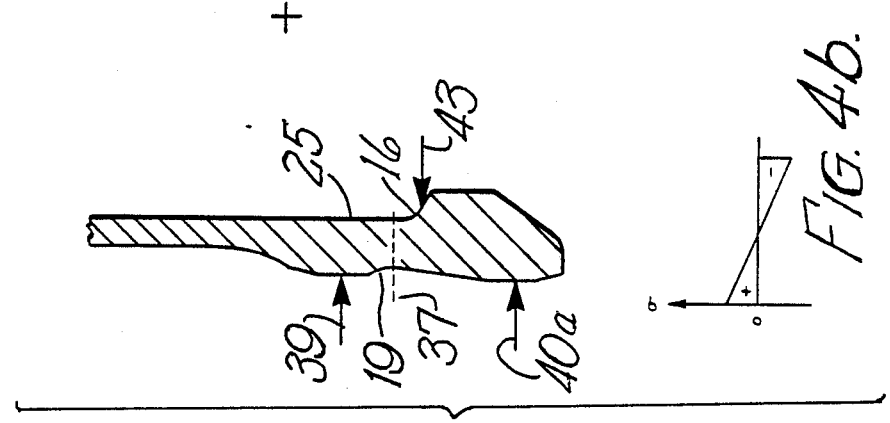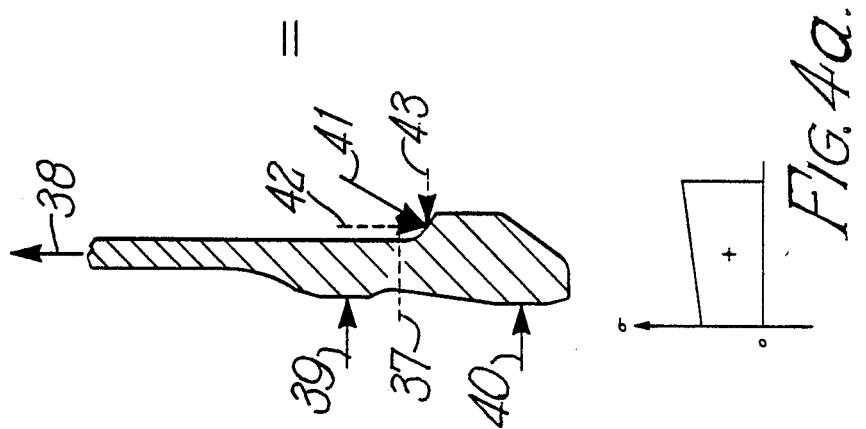

CONNECTOR WITH REDUCED STRESSES

FIELD OF THE INVENTION

The present invention relates to the latches of pipe connectors and can be applied to most types of latching systems. Canadian Patent Application No. 421-909 described a riser connector that provided significant benefits over existing connectors, particularly for fatigue properties.

BACKGROUND OF THE INVENTION

All connectors have some form of latch or hook that performs the actual joining together of parts. The latch usually has some form of back up structure to hold it in place but the most critical part of a connector is usually the latch. The hook part of the latch is generally the most highly stressed part, particularly the fillet radius between the hook face and the body of the latch. These stresses are always tensile stresses and for good fatigue characteristics these need to be kept as low as possible. Past practice has been to keep the fillet radius as large as possible or to have more complex fillet profiles to reduce the stress concentration in this area.

SUMMARY OF THE INVENTION

The present invention relates to the latch part of the connector, particularly in the area of the fillet radius between the hook of the latch and the side of the latch. The latch of any connector is usually the most highly stressed part, especially the fillet radius area referred to above. For good fatigue characteristics it is important to minimize the tensile stresses. The present invention specifically relates to reducing the tensile stress in the hook area of the latches.

The present invention seeks to reduce the maximum stress in the latch of a connector by applying a specific shape to the latch with the result that the latch bends during makeup such that the maximum stress is reduced. It includes: a latch with a hook shape on one face, two support surfaces on the opposite face, and a recess or undercut between the two support surfaces; a locking sleeve with two support surfaces that contact the two support surfaces on the latch when the connector is locked; a pipe body to which the upper end of the latch is connected; and a pipe body which the hook end of the latch locks onto.

The aforementioned Canadian Patent Application No. 421-909, corresponding to U.S. Pat. No. 4,662,785, issued May 5, 1987, and teaches the use of two support surfaces where the two surfaces disengage at the same time eliminating the possibility of high bending stresses during unlocking or locking of the connector. The present invention takes this further and shows that if an interference fit is made between the locking sleeve, the latch, and the part the latch hooks onto, and if latch thickness is reduced by undercutting between the two support points, then the stress in the area of the hook fillet radius is reduced.

According to a broad aspect of the invention there is provided a connector for joining two pipes or other structure together comprising a latch with a hook shape on one side, two support faces on the opposite side of the latch with one of support face located above the hook area and the other support face located below the hook area, and a recessed area between the two support faces such that the thickness of the latch at the hook area is less than that in the support areas, but more than that above the support areas, a hook configuration on the part to which the connection is to be attached, the shape of the hook being compatible with the hook on the latch, a locking sleeve with the two support faces that match the support faces on the latch, the dimensions being such that when the locking sleeve is slid over the latches an interference fit is obtained between the locking sleeve, the latches, and the part to which the connector is being attached.

BRIEF DESCRIPTION OF THE DRAWINGS

The invention is illustrated by way of example in the accompanying drawings in which:

FIG. 3a is a free body diagram of the latch similar to FIG. 2 but with only one support face, showing the forces acting on it, and also a stress diagram for a section;

FIG. 3b is a free body diagram of the latch shown in FIG. 2 showing the forces acting out on it, and also a stress diagram for another section;

FIG. 4a is a repeat of FIG. 3b for comparison with FIGS. 4b and 4c;

FIG. 4b is the free body diagram of FIG. 4a but with only the horizontal components of forces acting on it, and also a stress diagram, based on the horizontal forces, for a section; and FIG. 4c is the free body diagram of FIG. 4a showing the vertical components of forces acting on it, and also a stress diagram based on the vertical forces, or another section.

DETAILED DESCRIPTION OF THE INVENTION

Figure 1:
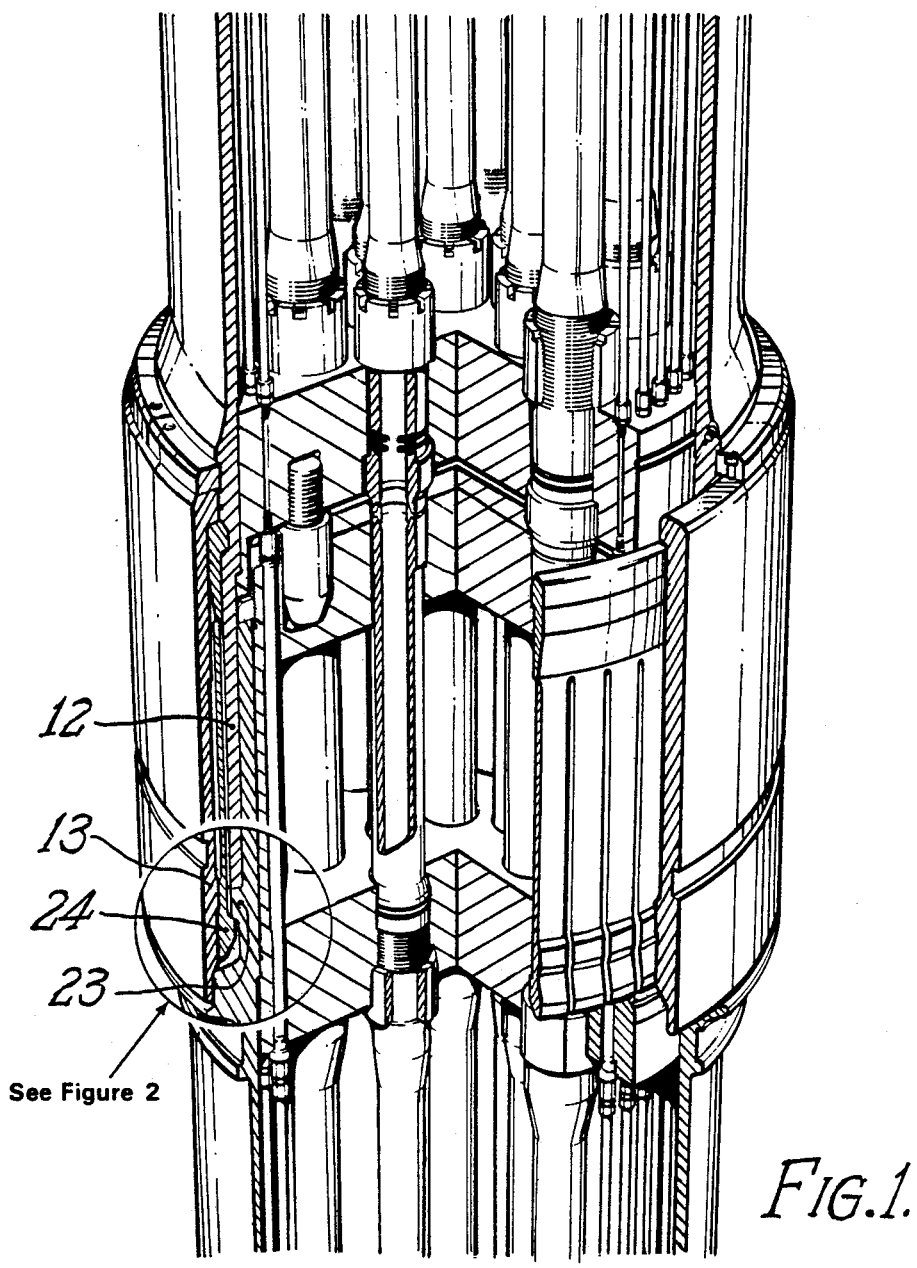
FIG. 1 is a perspective view of a connector with locking latches of the long finger collet type.
Figure 2:
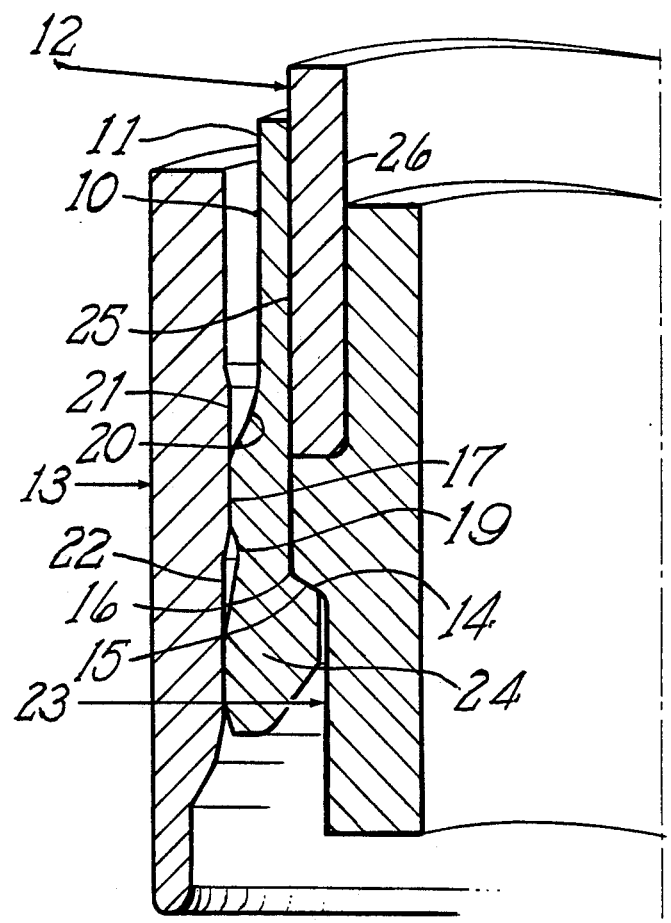
FIG. 2 is a cross-sectional view of the latches highlighted in FIG. 1.

FIG. 1 shows a typical riser connector with the latch area highlighted. This is shown enlarged in FIG. 2. The latch is activated by sliding the outer locking sleeve downwards which pushes the latch into full engagement. This operation is described in Canadian Patent Application No. 421-909.

Thus, in FIG. 1 is shown a connector joining two sections of an offshore production riser having a box end and a pin end, which fits into the box end. The connector consists of the box end casing 12, the pin end casing 23, the latches 10 and a locking sleeve 13. The latches 10 are formed from a cylindrical tube, which is slotted and divided equally into a number of individual latch segments. Each latch segment (FIG. 2) consists of an upper tensioning part 11 and a lower latching part 24. The lower latching part 24 has a sloping surface 15 which matches with the lower lip face 14 of the pin end casing 23 when engaged. A fillet radius 16 is formed at the intersection of the inner face 25 and the taper surface 15. There are two properly spaced outer surfaces or faces 17 and 18 provided at the lower latching body. When latched, these two surfaces 17 and 18 become in contact with the sliding faces 21 and 22 of the locking sleeve 13 and form the main radial load supports of the lower latching body 24. A large radius 20 is provided at the outer surface 26 of the latch located at the lower end of the tensioning body 11 to minimize stress concentration. A smooth undercut 19 is formed at the outer surface between the two surfaces 17 and 18 of the lower latch body 24 for the purpose of reducing the stress level at the fillet radius 16.

The latch 10 is activated by sliding the locking sleeve 13 downwards which pushes the latch 10 radially inwards. The wedging action between the two sliding surfaces 15 and 14 generates a gradually increasing tension load within the latch. In the fully latched position, the surfaces 14 and 15 are in full contact. The outer surfaces 17 and 18 are fully engaged with the sliding surfaces 21 and 22 of the locking sleeve 13 which secures the latch from moving radially outwards.

To illustrate the purpose of the undercut 19 and the two surfaces 17 and 18, FIGS. 3a and 3b show the differences between a single support surface latch and the present invention. FIG. 3a shows the free-body diagram of a typical connector latch 27 with a single support arrangement. In the fully latched position, the tension load 34 within the latch induces two equilibrium reacting forces 32 and 33 acting on the surfaces 29 and 30 respectively of the latch. At a cross-section indicated by dotted line 31 immediately above the fillet radius 28, the stress diagram shows a typical stress distribution across the section with a lower stress $S_2$ being at the outer surface 35 and a much higher stress $S_1$ at the inner surface 36. The high stress $S_1$ is a result of the combined stresses of bending stress, tensile stress, and stress concentrations.

FIG. 3b shows the free-body diagram of the connector latch 10 of the present invention. In the full latched position, the tension load 38 within the latch induces three equilibrium reacting forces 39, 40 and 41 acting on the surfaces 17, 18 and 15 respectively. The lower body 24 of the latch now functions as a two-point support loaded beam. As the latch engages, bending across the two supports 39 and 40 takes place. The stress diagram shows the typical stress distribution across the section indicated by dotted line 37 immediately above the fillet radius 16. Because of the added bending effect within this section, the combined stress found at the inner surface 25 is lower when it is compared with the latch 27 configuration shown in FIG. 3a. The stress $S_4$ at the outer surface 19 is higher when compared with the latch 27 shown in FIG. 3a, but more importantly, the maximum stress $S_3$ across the section 37 which occurs on the inner surface 25 is much less compared with the latch 27 shown in FIG. 3a. It is important that undercut 19 is positioned adjacent to where the maximum stress needs to be lowered. In this case it is opposite the fillet radius 16. Thus, the cross section is thinner at this point so the bending effects are centered at this location.

FIG. 3A shows the loading of a typical connector latch and a stress diagram showing the stress distribution across the section indicated. It can be seen that the highest stress is close to the fillet radius, i.e. there is a stress concentration at the radius. It is desirable to reduce this stress concentration in order to increase the fatigue life. This is accomplished by bending the latch as it engages as indicated in FIG. 3B. Here the locking sleeve load is taken in two places so that bending is produced which creates a compressive load at the fillet radius area.

FIG. 4 shows the basis for this. FIG. 4A repeats FIG. 3B and shows that in simplified terms it is madfe up of the addition of FIGS. 4B and 4C. In FIG. 4A the load on the hook is resolved into vertical and horizontal components which, looked at separately, are shown in FIGS. 4B and 4C.

For the horizontal load, if the load is resisted in two places as shown in FIG. 4B, then the latch is placed in bending with the resulting stress diagram shown. This indicates that the fillet radius area is placed in compression.

To understand the effect and advantage of the added bending across the section for lowering the stress concentration at the fillet 16 area, FIG. 4a, FIG. 4b and FIG. 4c illustrate the stress patterns further. FIG. 4a repeats FIG. 3b and illustrates the combined load components shown in FIG. 4b and FIG. 4c. FIG. 4b shows the horizontal load components 39, 40a and 43. The vertical load 42 and the horizontal load 43 are the load components resolved from the reacting load 41 acting on the taper surface 15. The stress diagram in FIG. 4b indicates the stress distribution across the section line 37 due to bending, with tensile stress on the outer surface 19 and compressive stress on the inner surface 25. FIG. 4c shows the vertical load 38, which is the primary load, acting on the latch 10 and reacting by the vertical load component 42. Horizontal load 40b, and others not shown, balance the free body diagram, but FIG. 4c is intended to show the effects of the vertical load components. Load bending and tension take place within the section under this loading condition. The stress diagram indicates the stress distribution across the section line 37 at the fillet 16 area. Both outer and inner surfaces 19 and 25 are under tensile stress at the cross section with a higher stress at the inner surface 25. By adding the stresses shown in FIG. 4b and FIG. 4c, the result is shown in FIG. 4a which illustrates the effect of the added bending in the latch.

Based on the foregoing it is necessary that an interference fit exits between the locking sleeve 13, the latch 24, and the pin casing 23 when the connector is in the lock position. The amount of interference fit between each component will determine the amount of bending and the stress distribution. The purpose of the undercut is to ensure that most of the bending takes place in this area. However, it is important that the thickness of the latch in this area be such that it keeps the average stress to an acceptable level. Thus to those skilled in the art it is possible to proportion the overall geometry such that the position of the two support faces, the thickness of the latch above the support faces, the thickness at the support faces, the thickness between the support faces, and the amount of interference fit at each support point, will combine to reduce the maximum stress compared to a latch that does not have these features.

We claim:

1. A connector for axially joining two pipes or like structures together, said connector comprising:
   latching means having a plurality of circumferentially arranged latching segments for sliding over the outer surface of said pipes to retain said pipes together;
   a locking sleeve for sliding over said latching means and the joining ends of said pipes;
   each of said latching segments having an inwardly directed hook portion and a pair of axially spaced support faces on its outer surface, one of said support faces located above said hook portion and the other support face located below said hook portion; and a recessed undercut area on the outer surface of said segments between said support faces;
   the thickness of said segments in said recessed, undercut area being less than that in the areas of said support faces but greater than the thickness of said segments in the area above said support faces;

a hook-engaging lip on one of said pipes to be joined and having a surface configuration complimentary to that on said inwardly directed hook portion of said latching segments;

said locking sleeve having two annular support faces on its inner surface which slidably engage the support faces on said lathing segments;

the dimensions of the elements being such that, when the locking sleeve is slid over the latching segments, an interference fit is obtained between said locking sleeve, said latching segments and the part to which said connector is being attached.

2. A connector for joining two pipe sections in axial alignment wherein one pipe section has a box end and the other pipe section has a pin end which fits into said box end, said connector comprising cylindrical latching means having a plurality of circumferentially arranged, elongated latching segments for sliding over the outer surface of said box and pin ends to retain said ends together and a locking sleeve for sliding over said latching means and said box and pin ends;

each of said latching segments having (a) an inwardly directed hook portion adjacent its lower end (b) a pair of axially spaced support faces on the outer surface of said segment, one of said support faces being located above said hook portion and the other support face being located below said hook portion, and a recessed, undercut area on the outer surface of said segments in said recessed undercut area being less than that in the areas of said support faces but greater than the thickness of said segments in the area above said support faces;

an annular, hook-engaging lip on said pin end and having a surface contour complementary to that on said inwardly directed hook on said latching segment;

said locking sleeve having two annular support faces on its inner surface and which compliment and slidably engage the support faces on said latching segments; and wherein the dimensions of the elements being such that, when the locking sleeve is slid over the latching segments, an interference fit is obtained between said locking sleeve, said latching segments and the part to which said connector is being attached.

* * * * *